United States Patent [19]
Boerner

[11] 3,782,255
[45] Jan. 1, 1974

[54] PHOTOGRAPHIC APPARATUS WITH AUTOMATIC DIAPHRAGM ADJUSTING MEANS

[75] Inventor: Gerhard Boerner, Musberg, Germany

[73] Assignee: Robert Bosch Photokino GmbH, Stuttgart, Germany

[22] Filed: Oct. 5, 1972

[21] Appl. No.: 295,365

[30] Foreign Application Priority Data
Oct. 8, 1971 Germany.................. P 21 50 185.9

[52] U.S. Cl................ 95/10 C, 95/64 D, 352/141, 356/225
[51] Int. Cl. ........ G01j 1/04, G01j 1/16, G03b 9/02
[58] Field of Search................ 95/64 R, 64 D, 10 C; 352/141; 356/218, 225, 233

[56] References Cited
UNITED STATES PATENTS

| | | | |
|---|---|---|---|
| 3,180,241 | 4/1965 | Mikusch et al. ..................... | 95/64 D |
| 3,077,154 | 2/1963 | Jullien-Davin ..................... | 95/64 D |
| 3,194,136 | 7/1965 | Ort..................................... | 95/64 D X |
| 3,436,147 | 4/1969 | French............................... | 352/141 |
| 3,542,462 | 11/1970 | Bertran .............................. | 352/141 |
| 3,547,022 | 12/1970 | Baron ................................ | 352/141 X |
| 3,209,667 | 10/1965 | Coutant............................ | 352/141 X |

*Primary Examiner*—Joseph F. Peters
*Attorney*—Michael S. Striker

[57] ABSTRACT

The diaphragm of a camera is adjustable by a light meter which is in circuit with a photoelectric transducer receiving scene light from a stationary vane of the diaphragm. The diaphragm has a movable vane which is located in front of the stationary vane. The stationary vane has a surface which reflects some light from the incoming beam of scene light, and the reflected light impinges upon the transducer which can be mounted on a support for the stationary and/or movable vane or is attached directly to the stationary vane. The area of the light reflecting surface or the reflectivity of such surface varies with changes in the aperture size so that the ratio of the amount of scene light which is reflected against the transducer to the amount of scene light which passes through the aperture is constant for all positions of the movable vane. The same result can be obtained if the stationary vane embodies a filter or an auxiliary diaphragm whose light transmissivity or shape varies with changes in the aperture size to insure that the ratio of the amount of light reaching the transducer to the amount of light which passes through the aperture remains constant for all positions of the movable vane.

32 Claims, 9 Drawing Figures

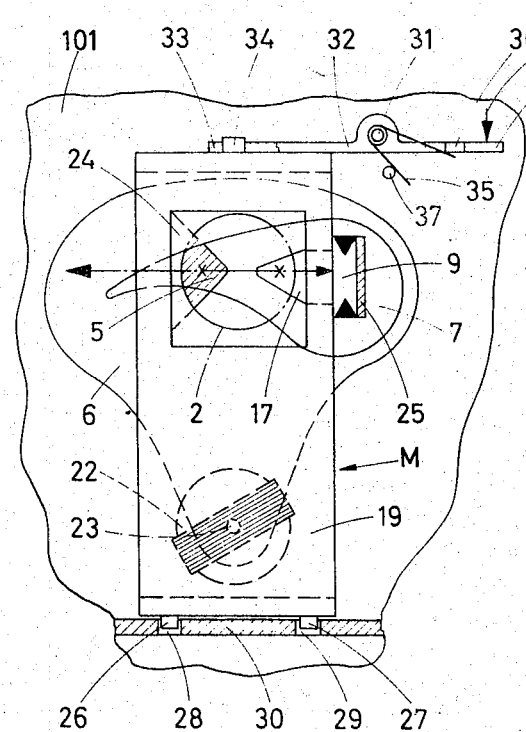
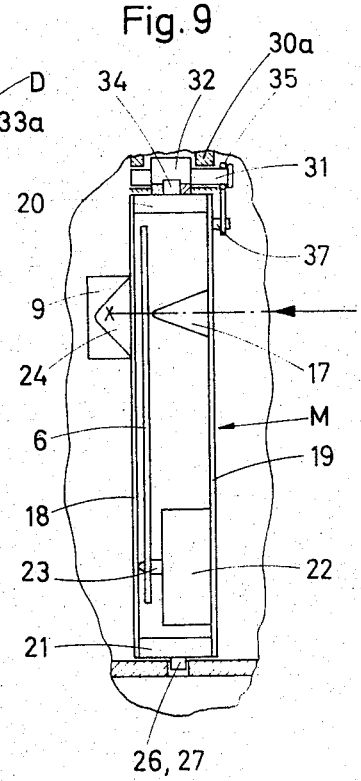
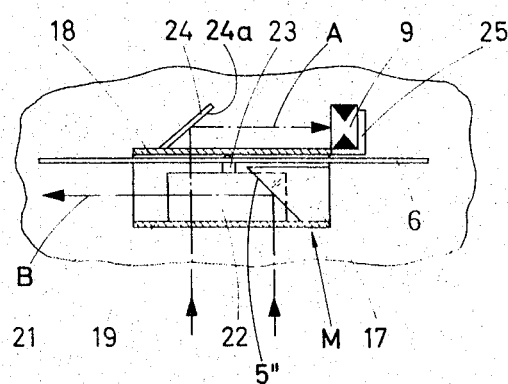

PHOTOGRAPHIC APPARATUS WITH AUTOMATIC DIAPHRAGM ADJUSTING MEANS

BACKGROUND OF THE INVENTION

The present invention relates to photographic apparatus in general, and more particularly to improvements in diaphragms for use in photographic apparatus. Still more particularly, the invention relates to improvements in photographic apparatus of the type wherein the diaphragm is designed to deflect a portion of incoming scene light and wherein the size of the aperture which is defined by the diaphragm is adjustable automatically as a function of changes in scene brightness.

It is already known to provide a motion picture camera with a rotary shutter which reflects scene light when it prevents scene light from reaching a film frame. The reflected light is directed against one or more photoelectric transducers which form part of the diaphragm adjusting means. A drawback of such motion picture cameras is that the rear optical element of the picture taking lens must be mounted at a considerable distance from the film guide. Moreover, a shutter having an entire side formed as a mirror in order to be capable of reflecting light against one or more photoelectric transducers is quite expensive. Additional problems arise due to the fact that the photosensitive transducer or transducers are not continuously exposed to scene light but only during those phases of camera operation when the shutter shields the film from incoming light. Thus, the transducer or transducers receive light impulses in rhythm with the frequency at which the shutter admits light to successive film frames. This necessitates the provision of complex and expensive means which compensates for differences between the aperture size which is furnished by the diaphragm when the shutter rotates and the aperture size which is furnished when the shutter is at a standstill.

In accordance with another presently known proposal, the camera comprises means for continuously directing scene light against one or more photoelectric transducers which form part of adjusting means for changing the aperture size as a function of changes in scene brightness. For example, it is known to place across the path of the incoming beam of scene light an optical element which transmits a first portion of scene light and reflects the remaining second portion of scene light against one or more transducers. It is also known to place in front of the movable diaphragm vane a stationary mirror which fully reflects a portion of the incoming beam of scene light against one or more transducers. The just described modes of obtaining scene light for one or more transducers are not suitable for satisfactory regulation of the aperture size; they are merely capable of controlling the movement of one or more vanes as a function of changes in scene brightness. "Regulation" means here an adjustment within a self-contained field of activity in which the measured value is being compared with an adjusted theoretical value and where a possible difference between theoretical value and measured value is being adjusted. On the contrary to regulation "controlling" means only an adjustment according to the measured value without comparison between theoretical value and measured value and its adjustment. Thus, though the last mentioned proposals are simpler and can be incorporated into a camera at a lower cost, they cannot insure as satisfactory regulation of aperture size as a shutter which is provided with mirrored surfaces for directing some incoming scene light toward one or more photoelectric components of the diaphragm adjusting means.

Attempts to improve the second group of presently known constructions so as to insure an accurate and reliable regulation of the aperture size include the mounting of photoelectric transducers directly on the vanes of a diaphragm. This proposal is satisfactory in one respect because the diaphragm and the adjusting means therefor occupy little room; however, such diaphragms cannot be used in compact motion cameras including those which use 8-millimeter film. This is due to the fact that the diaphragm is too expensive because it cannot be used with commercially available photoelectric transducers. The entire photosensitive surfaces of presently known transducers which are used in such diaphragms exhibit a uniform sensitivity to light and the resistance which the transducers offer when not exposed to light must be calculated and considered with an extremely high degree of accuracy which contributes significantly to the cost of the diaphragm and to the cost of the entire photographic apparatus.

It was further proposed to place a stationary vane behind the movable vane or vanes of the diaphragm and to provide the stationary vane with a light-reflecting surface which faces the rotary shutter in a motion picture camera. The shutter is also provided with a light-reflecting surface which directs scene light against the light-reflecting surface of the stationary vane which, in turn, reflects light against a photoelectric transducer. This proposal exhibits the same drawbacks as the previously discussed proposals to provide the shutter with one or more mirrors, i.e., the transducer receives a series of light impulses when the shutter rotates during the making of exposures. Furthermore, only a portion of light which is reflected by the shutter (when the latter prevents scene light from reaching a film frame) can be reflected against the stationary vane. Thus, the stationary vane reflects only a very small percentage of scene light which has been deflected by the shutter at a point close to the film plane. Consequently, the stationary vane is likely to reflect light which is reflected from a relatively dark or a relatively bright part of the subject or scene so that the selected aperture size is not a reliable function of prevailing scene brightness. Such exposure controls are used primarily for directed or partial measurement of the intensity of scene light, a feature which is of no particular significance in connection with motion picture cameras which employ 8-millimeter film because the area which can be evaluated for measurement varies with changes in the aperture size. When the aperture size decreases, the stationary vane intercepts a steadily growing portion of the incoming light which portion is reflected by the rear mirror of the stationary vane.

SUMMARY OF THE INVENTION

An object of the invention is to provide a photographic camera with diaphragm adjusting means which allows for accurate and reliable regulation of the aperture size and which includes means for deflecting some light from the incoming beam of scene light at a point which is located close to the plane of the diaphragm.

Another object of the invention is to provide diaphragm adjusting means which can use commercially available photoelectric transducer means and which insures uniform illumination of the photosensitive surface of each transducer means.

A further object of the invention is to provide diaphragm adjusting means which occupies little room in the housing or body of a photographic apparatus and which does not exhibit the drawbacks of diaphragm adjusting means wherein the transducer or transducers receive a series of light impulses.

An additional object of the invention is to provide diaphragm adjusting means which comprises a small number of relatively simple, rugged and inexpensive parts and which can be at least partially assembled, inspected and/or tested prior to mounting in the housing or body of a camera.

Still another object of the invention is to provide diaphragm adjusting means wherein the transducer or transducers receive scene light which is reflected by the vane means of the diaphragm.

A further object of the invention is to provide an improved diaphragm for use with the novel adjusting means.

The invention is embodied in a photographic apparatus which comprises a picture taking lens serving to admit a beam of scene light, a diaphragm including a first vane and at least one additional or second vane defining with the first vane an aperture of variable size in register with the picture taking lens, and adjusting means for moving at least the first vane relative to the second vane to thereby vary the size of the aperture as a function of changes in scene brightness. The adjusting means includes photoelectric transducer means and one of the vanes has a light-reflecting surface which extends into the path of propagation of the light beam and is located behind the other vane, as considered in the direction of travel of the light beam. The surface is arranged to reflect light against the transducer means which may control the position of the first vane by being in circuit with a light meter having an output element which can move the first vane. The one vane of the diaphragm has at least one characteristic (e.g., the reflectivity or the illuminated area of the light-reflecting surface) which varies with the size of the aperture so that the ratio of the aperture size (and hence of the amount of scene light passing through the aperture) to the amount of light which is reflected by the surface of the one vane against the transducer means remains constant for all positions of the first vane.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is a fragmentary side elevational view of a camera wherein the diaphragm and the diaphragm adjusting means form a single prefabricated module;

FIG. 8 is an end elevational view of the structure shown in FIG. 7; and

FIG. 9 is a horizontal sectional view of the structure shown in FIG. 7.

DESCRIPTION OF THE PREFERRED EMBODIMENTS

Figure 1:
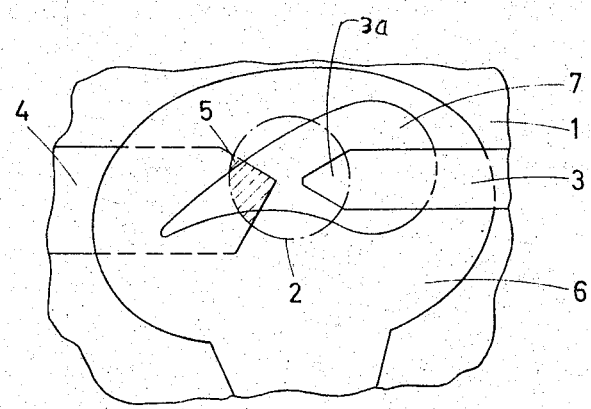
FIG. 1 is a fragmentary elevational view of a portion of a motion picture camera including a diaphragm and diaphragm adjusting means embodying one form of the invention.

FIG. 1 illustrates a portion of the housing or body 1 of a photographic apparatus. The reference character 2 denotes a beam of incoming scene light which has passed through the picture taking lens including a rear optical element 8 shown in FIG. 2. The diaphragm of the photographic apparatus comprises a stationary portion or vane 3 having a triangular part 3a extending into the path of the light beam 2, another stationary portion or vane 4 also having a triangular part 5 extending into the path of the light beam 2, and a movable portion or vane 6 having a substantially horn-shaped light-transmitting opening 7. The part 5 of the stationary vane 4 is mirrored to reflect a portion (arrow A in FIG. 2) of the light beam 2 against a photoelectric transducer 9 located behind the plane of the movable vane 6, as viewed in the direction of incoming scene light. The transducer forms part of the diaphragm adjusting means and is in circuit with a light meter, such as the instrument 22 shown in FIGS. 7–9. The stationary vane 3 is located in front of the plane of the movable vane 6. The stationary vane 4 is a prismatic member consisting of metal or other suitable material, and the part 5 may be integral with the prismatic member or constitutes a separately produced element which is fixedly secured to the vane 4 to extend into the path of the light beam 2.

The plane of the reflecting surface on the part 5 of the vane 4 is inclined relative to the optical axis of the lens including the optical element 8. At least that portion of the light-reflecting surface on the part 5 which is nearest to the optical axis is located in the diaphragm plane of the lens.

Figures 2, 3:
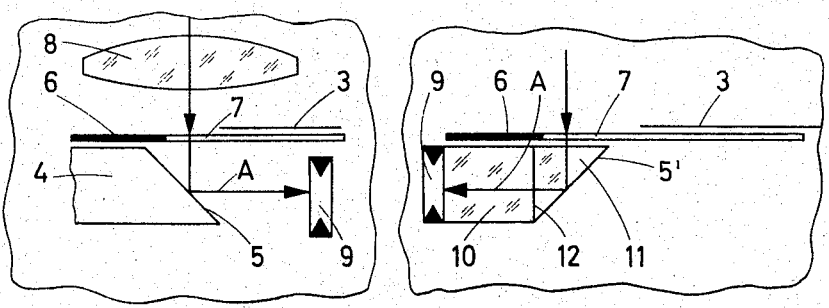
FIG. 2 is a plan view of the structure shown in FIG. 1.
FIG. 3 is a similar plan view of a portion of a second camera wherein a stationary vane of the diaphragm embodies a filter or an auxiliary diaphragm.

FIG. 3 illustrates a portion of a slightly modified photographic apparatus wherein the stationary vane 4 of FIGS. 1 and 2 is replaced by a vane including two prisms 10 and 11. An adapter 12 which contitutes a filter or an auxiliary diaphragm is installed between and secured to the prisms 10 and 11. The prism 11 corresponds to the part 5 of the vane 4 and has a mirrored surface 5' serving to deflect a portion (arrow A) of the light beam 2 against a photoelectric transducer 9 located behind the prism 10. The prisms 10, 11 can be connected with the adapter 12 and transducer 9 by resorting to a suitable light-transmitting putty. The prisms 10, 11 act not unlike a light-conducting rod which directs a portion of the light beam 2 (not shown in FIG. 3) against the transducer 9. The surface 5' of the prism 11 is preferably a light-dispersing surface to insure uniform illumination of the transducer 9 irrespective of the brightness of scene light and independently of the momentary effective size of the diaphragm.

It will be noted that the surface 5' is located at one end and the transducer 9 is located at the other end of the light-conducting rod including the prisms 10 and 11.

Figures 4, 5:
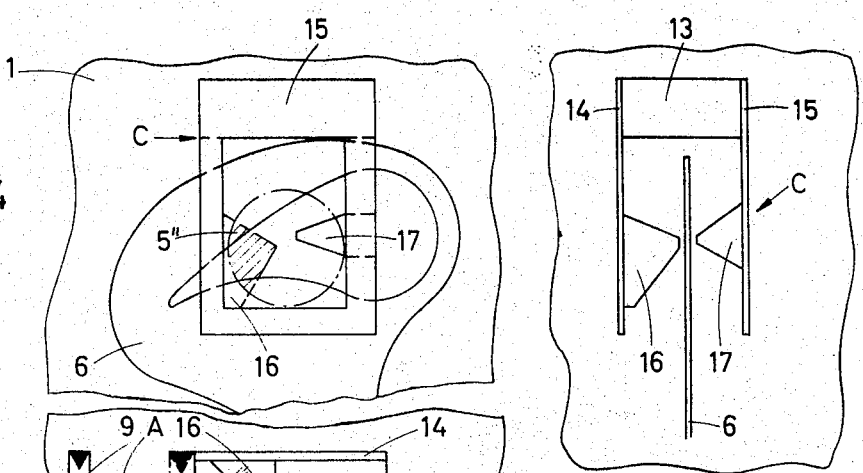
FIG. 4 is a fragmentary side elevational view of a third camera wherein the two stationary vanes are mounted on a common support.
FIG. 5 is an end elevational view of the structure shown in FIG. 4.
Figure 6:
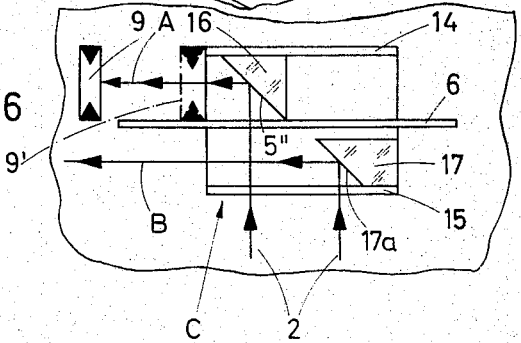
FIG. 6 is a plan view of the structure shown in FIG. 4.

In the embodiment of FIGS. 4 to 6, the movable vane 6 of the diaphragm is flanked by the rectangular frame-like legs 14, 15 of a support or carrier C further having a distancing member 13 located between the legs 14, 15 to insure that the vane 6 can move relative to a pair of stationary vanes 16, 17. The vane 16 is provided on the leg 14 and constitutes a first light-reflecting prism having a surface 5'' serving to direct a portion (arrow A) of the light beam 2 against a photoelectric transducer 9 which is spaced apart from the prism 16. If desired, the transducer 9 can be secured directly to the leg 14 of the support C (see the phantom-lime position 9' of the transducer in FIG. 6).

The vane 17 also constitutes a prism having a mirrored surface 17a which reflects a portion (arrow B) of the light beam 2 into a viewfinder, not shown.

The legs 14, 15 of the support C may consist of sheet metal and may be glued or otherwise connected to the distancing member 13 and to the respective prisms 16, 17. In assembling the structure of FIGS. 4 to 6, the movable vane 6 is mounted on the output member of a suitable light meter (not shown) and the parts 13–17 preferably constitute a prefabricated unit which is inserted into the housing 1 from above so that the legs 14, 15 are located at the opposite sides of the plane of the movable vane 6.

The photographic apparatus which embodies the structure of FIGS. 7 to 9 includes a single prefabricated module M having a frame or support composed of two spaced-apart parallel panels 18, 19 and two distancing members 20, 21. The panel 19 carries a light meter 22 (e.g., a moving coil measuring instrument) having a rotary output member 23 whose angular position is a function of the prevailing scene brightness and which carries the movable vane 6 of the diaphragm. The panel 19 further supports the vane or prism 17 for the light beam portion B which is directed into the viewfinder. The anel 18 is formed with a triangular slit to provide a triangular vane or lug 24 one surface 24a of which is mirrored to reflect the light beam portion A against a photoelectric transducer 9. The latter is mounted on a bracket 25 which is secured to the outer side of the panel 18. The transducer 9 is in circuit with the light meter 22.

The distancing member 21 is provided with coupling pins 26, 27 removably received in complementary sockets 28, 29 of an internal partition or well 30 forming part of the camera housing 101. When the pins 26, 27 are properly received in the sockets 28, 29, the module M is properly mounted in the housing 101 and can be removably held in such position by a detent structure including a two-armed lever 32 pivotable on a pin 31 which is provided in or close to the top wall 30a of the housing 101. The arm 33 of the lever 32 has an opening for a pin 34 on the distancing member 20. By applying to the lever 32 a pressure in the direction indicated by arrow D, a repairman or an assembler can disengage the arm 33 from the pin 34 so that the module M can be removed from the housing 101 by lifting the coupling pins 26, 27 out of the respective sockets 28, 29 of the partition 30. The detent lever 32 is biased to the illustrated operative position by a torsion spring 35 which reacts against a stationary post 37 and bears against a lateral projection 36 of the right-hand arm 33a of the lever 32.

The lug 24 can be provided with a convex light-reflecting surface 24a to insure dispersal of light (arrow A) and uniform illumination of the entire photosensitive surface of the transducer 9, irrespective of the angular position of the movable vane 6.

The support 18–21 of the module M preferably carries some or all of the electrical and/or electronic components of the diaphragm adjusting means, such as a printed circuit, one or more transducers, a battery and/or others.

When the output member 23 of the light meter 22 pivots the vane 6 in a clockwise direction, as viewed in FIG. 7 (in response to increasing scene brightness), the effective size of the aperture which is defined by the diaphragm decreases proportionally with a decrease of that portion of the mirrored surface 24a which directs light A against the transducer 9. By properly selecting the shape of the surface 24a and/or the adapter (such as the filter or auxiliary diaphragm 12 of FIG. 3), the ratio of the aperture size to the illuminated area of the surface 24a remains constant for all angular positions of the movable vane 6. This insures a satisfactory regulating operation of the exposure control embodying the module M. Similar observations apply for the light reflecting means 5 and 5' of FIGS. 1–2 and 3, and for the light-reflecting surface 5'' of the structure shown in FIGS. 4–6.

The same result can be obtained if the reflectivity of the reflecting surface on the part 5 of FIGS. 1–2 or the reflectivity of the surface 5', 5'' or 24a varies with the size of the aperture so that the ratio of the aperture size (and hence of the amount of scene light passing through the aperture) to the amount of light which is reflected by the respective surface from the light beam 2 against the transducer 9 or 9' is constant for all positions of the movable vane 6. Thus, one of the characteristics including (a) the area of that portion of the surface on the part 5 or the surface 5', 5'' or 24a which reflects scene light in various positions of the movable vane 6 and (b) the reflectivity of such surface must vary with the size of the aperture so that the ratio of the amount of reflected light (arrow A) to the amount of light passing through the aperture is constant for all positions of the movable vane.

Referring again to FIG. 3, the parts numbered 10, 11 and 12 can be said to constitute a composite vane of the diaphragm which further includes the vanes 3 and 6. In this embodiment of the invention, the characteristic which varies with the changes in aperture size may be the shape of the adapter 12 (e.g., when the adapter is an auxiliary diaphragm) or the light transmissivity of the adapter 12 (if the latter is a filter). In other words, the aforementioned characteristic may be the illuminated area or the refectivity of a light-reflecting surface or the shape or light transmissivity of an adapter. The adapter 12 may include a filter and an auxiliary diaphragm.

The surface of the part 5 or the surface 5', 5'' or 24a is preferably located in or close to the diaphragm plane of the picutre taking lens.

It is also within the purview of the invention to provide the surface which reflects light against the transducer on a movable vane of the diaphragm.

The supports shown in FIGS. 4-6 and 7-9 render it possible to assemble at least a portion of the diaphragm and of the diaphragm adjusting means prior to mounting in the camera housing. The support C of FIGS. 4-6 or the support including the parts 18-21 of FIGS. 7-9 can be used as a carrier for one, two or all three vanes of the diaphragm shown in FIG. 3, i.e., a single support can carry the prism 11 which is provided with the surface 5', the prism 10 and the adapter 12. Also, such support can serve as a mounting means for the transducer 9.

It will be noted that the vane which reflects light against the transducer is located behind at least one other vane of the diaphragm. With reference to FIGS. 1 and 2, the vane 3 is located in front and the vane 4 is located behind the movable vane 6.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, the combination of a picture taking lens arranged to admit a beam of scene light; a diaphragm including a first vane and a second vane defining with said first vane an aperture of variable size in register with said lens; and adjusting means for moving at least said first vane relative to said second vane to thereby vary the size of said aperture as a function of changes in scene brightness, said adjusting means including photoelectric transducer means and one of said vanes having a light-reflecting surface extending into the path of propagation of said light beam, said one vane being located behind the other of said vanes, as considered in the direction of travel of said light beam, and said surface being arranged to reflect light against said transducer means, said one vane having at least one characteristic which varies with the size of said aperture so that the ratio of the size of said aperture—and hence of the amount of scene light passing through said aperture—to the amount of light which is reflected by said surface from said beam against said transducer means is constant for all positions of said first vane.

2. The combination of claim 1, wherein said one vane is closely adjacent to said picture taking lens.

3. The combination of claim 1, wherein said surface is located in or close to the diaphragm plane of said lens.

4. The combination of claim 1, wherein said characteristic is the reflectivity of said surface.

5. The combination of claim 1, wherein said characteristic is the area of that part of said surface which reflects scene light in various positions of said first vane.

6. The combination of claim 1, wherein said one vane further comprises adapter mean located in the path of scene light which is reflected by said surface and arranged to compensate for eventual deviations of the amount of light which is reflected by said surface from the amount necessary to maintain said ratio constant.

7. The combination of claim 6, wherein said adapter means includes filter means.

8. The combination of claim 6, wherein said adapter means includes an auxiliary diaphragm.

9. The combination of claim 6, wherein said characteristic is the shape of said adapter means.

10. The combination of claim 6, wherein said characteristic is the light transmissivity of said adapter means.

11. The combination of claim 1, wherein said one vane further comprises adapter means located in the path of scene light which is reflected by said surface and arranged to compensate for eventual deviations of the amount of light which is reflected by said surface from the amount necessary to maintain said ratio constant, and further comprising common support means for said surface and said adapter means of said one vane.

12. The combination of claim 1, wherein said one vane is a stationary vane.

13. The combination of claim 1, further comprising common support means for said one vane and said transducer means.

14. The combination of claim 1, further comprising common support means for said one vane and said transducer means, said one vane further comprising adapter means mounted on said support means in the path of scene light which is reflected by said surface and arranged to compensate for eventual deviations of the amount of light which is reflected by said surface from the amount necessary to maintain said ratio constant.

15. The combination of claim 1, wherein said surface is arranged to disperse said reflected light over the entire photosensitive surface of said transducer means.

16. The combination of claim 1, wherein said diaphragm further comprises a third vane having a light-reflecting portion extending into the path of said light beam to deflect a second portion of said light beam into the viewfinder of the photographic apparatus.

17. The combination of claim 16, further comprising common support means for said one vane and said third vane.

18. The combination of claim 17, wherein said third vane is located in front of said first vane, as considered in the direction of travel of said light beam.

19. The combination of claim 17, wherein said transducer means is mounted on said support.

20. The combination of claim 17, wherein said one vane includes adapter means extending across the path of light which is reflected by said surface and arranged to compensate for eventual deviations of the amount of light which is reflected by said surface from the amount necessary to maintain said ratio constant.

21. The combination of claim 1, wherein said light-reflecting surface is inclined relative to the optical axis of said picture taking lens and includes a portion located nearest to said axis, said portion of said surface being located in or close to the diaphragm plane of said lens.

22. The combination of claim 1, wherein said one vane includes adapter means extending across the path of light which is reflected by said surface and arranged to disperse said light over the entire photosensitive surface of said transducer means.

23. The combination of claim 1, wherein said surface is a light-dispersing surface and said one vane constitutes a light-conducting rod.

24. The combination of claim 23, wherein said surface is located at one end of said rod and said transducer means is secured to the other end of said rod.

25. The combination of claim 1, further comprising a substantially U-shaped support for said one vane, said support having two spaced-apart portions disposed with clearance at the opposite sides of said first vane.

26. The combination of claim 1, further comprising a support for said vanes, said support including pivot means for said first vane.

27. The combination of claim 26, wherein said adjusting means further comprises means for moving said first vane relative to said support.

28. The combination of claim 27, wherein said means for moving said first vane comprises a moving-coil instrument mounted in said support and having an output member constituting said pivot means.

29. The combination of claim 27, wherein said support, said diaphragm and said adjusting means constitute a single self-supporting module and further comprising means for detachably coupling said module to the housing of said photographic apparatus.

30. The combination of claim 1, further comprising a support having a panel provided with a lug which constitutes said one vane and has a mirrored surface constituting said light-reflecting surface.

31. The combination of claim 1, wherein said one vane is a light-conducting rod and said light-reflecting surface is provided at one end of said rod.

32. The combination of claim 1, further comprising a support for said diaphragm and said adjusting means, said adjusting means including at least one electrical component other than said transducer means, said additional component being mounted on said support.

* * * * *